US008352047B2

(12) United States Patent
Walter

(10) Patent No.: US 8,352,047 B2
(45) Date of Patent: Jan. 8, 2013

(54) APPROACHES FOR SHIFTING A SCHEDULE

(75) Inventor: Gerald Walter, Canton, OH (US)

(73) Assignee: Honeywell International Inc., Morristown, NJ (US)

( * ) Notice: Subject to any disclaimer, the term of this patent is extended or adjusted under 35 U.S.C. 154(b) by 307 days.

(21) Appl. No.: 12/643,865

(22) Filed: Dec. 21, 2009

(65) Prior Publication Data
US 2011/0153033 A1    Jun. 23, 2011

(51) Int. Cl.
G05B 11/01 (2006.01)
(52) U.S. Cl. .................. 700/11; 700/277; 700/306
(58) Field of Classification Search .................. 700/16, 700/277, 306
See application file for complete search history.

(56) References Cited

U.S. PATENT DOCUMENTS

| 4,375,637 | A  | 3/1983  | Desjardins       |
|-----------|----|---------|------------------|
| 4,816,208 | A  | 3/1989  | Woods et al.     |
| 5,042,265 | A  | 8/1991  | Baldwin et al.   |
| 5,161,387 | A  | 11/1992 | Metcalfe et al.  |
| 5,385,297 | A  | 1/1995  | Rein et al.      |
| 5,390,206 | A  | 2/1995  | Rein et al.      |
| 5,768,119 | A  | 6/1998  | Havekost et al.  |
| 5,929,761 | A  | 7/1999  | Van der Laan et al. |
| 5,946,303 | A  | 8/1999  | Watson et al.    |
| 5,955,946 | A  | 9/1999  | Beheshti et al.  |
| 6,124,790 | A  | 9/2000  | Golov et al.     |
| 6,178,362 | B1 | 1/2001  | Woolard et al.   |
| 6,185,483 | B1 | 2/2001  | Drees            |
| 6,223,544 | B1 | 5/2001  | Seem             |
| 6,295,526 | B1 | 9/2001  | Kreiner et al.   |
| 6,295,527 | B1 | 9/2001  | McCormack et al. |
| 6,314,328 | B1 | 11/2001 | Powell           |
| 6,351,213 | B1 | 2/2002  | Hirsch           |
| 6,356,282 | B2 | 3/2002  | Roytman et al.   |
| 6,420,968 | B1 | 7/2002  | Hirsch           |

(Continued)

FOREIGN PATENT DOCUMENTS
WO     WO 01/97146     12/2001
(Continued)

OTHER PUBLICATIONS

"Excel 15b, W7760B Building Manager", User's Guide, Honeywell 2005.*
(Continued)

*Primary Examiner* — Carlos Ortiz Rodriguez
(74) *Attorney, Agent, or Firm* — Seager Tufte & Wickhem LLC

(57) ABSTRACT

An approach for making shifted schedules from a regular or master schedule of a building automation system. Shifted schedules may be obtained by applying shifts to the scheduled-on and scheduled-off periods of the days in the master schedule. One set of shifts may apply uniformly to all days of the week or several sets of different shifts may apply to various days of the week. Special events with certain scheduled-on and scheduled-off periods and assigned to particular days may override the regular scheduled-on and scheduled-off periods of those days. The shifted schedules may also contain special events with their periods shifted. The master schedule may govern the regular operating hours of a building and the shifted schedules may control, for example, HVAC equipment in particular zones, certain employee areas, parking lot lights, and so on. Changes to the master schedule may be applied as updates to the shifted schedules.

19 Claims, 14 Drawing Sheets

U.S. PATENT DOCUMENTS

| | | | |
|---|---|---|---|
| 6,430,712 B2 | 8/2002 | Lewis | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,457,869 B2 | 11/2008 | Kernan | |
| 7,460,020 B2 | 12/2008 | Reyes et al. | |
| 7,596,613 B2 | 9/2009 | Silverthorne et al. | |
| 7,653,459 B2 | 1/2010 | Pouchak et al. | |
| 7,819,334 B2 | 10/2010 | Pouchak et al. | |
| 2002/0152298 A1* | 10/2002 | Kikta et al. | 709/223 |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2005/0038571 A1 | 2/2005 | Brickfield et al. | |
| 2005/0043862 A1 | 2/2005 | Brickfield et al. | |
| 2005/0193285 A1 | 9/2005 | Jeon | |
| 2005/0203490 A1 | 9/2005 | Simonson | |
| 2005/0230490 A1 | 10/2005 | Pouchak et al. | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2008/0010049 A1 | 1/2008 | Pouchak et al. | |
| 2008/0015739 A1 | 1/2008 | Wacker | |
| 2008/0016493 A1 | 1/2008 | Pouchak et al. | |
| 2008/0115153 A1 | 5/2008 | Brindle | |
| 2008/0125914 A1 | 5/2008 | Wacker | |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0287130 A1 | 11/2010 | Guralnik et al. | |
| 2011/0010654 A1 | 1/2011 | Raymond et al. | |

FOREIGN PATENT DOCUMENTS

| | | |
|---|---|---|
| WO | WO 02/052432 | 7/2002 |
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

"FX Workbench", User's Guide, Software Release 2.0, Johnson Controls, May 19, 2008.*

Adobe Acrobat 6.0 Standard, Version 6.0.2, Screenshots, 2 pages, May 18, 2004.

U.S. Appl. No. 12/703,476, filed Feb. 10, 2010.

U.S. Appl. No. 12/722,364, filed Mar. 11, 2010.

U.S. Appl. No. 12/792,547, filed Jun. 2, 2010.

U.S. Appl. No. 12/822,997, filed Jun. 24, 2010.

U.S. Appl. No. 12/977,701, filed Dec. 23, 2010.

http://blogs.msdn.com/b/khen1234/archive/2005/05/11/416392. aspx, "Regular Expressions in T-SQL," 4 pages, May 11, 2005.

http://www.google.com/maps, "Google Maps, Pin Location," 1 page, prior to Nov. 21, 2008.

Microsoft Word Screen Shots, 2 pages, prior to Nov. 21, 2008.

http://en.wikipedia.org/wiki/JAR_(file_format), "JAR (file Format)—Wikipedia, the Free Encyclopedia," 3 pages, printed Dec. 26, 2009.

Honeywell Spyder Bacnet User's Guide, 242 pages, Revised Jul. 2009.

Honeywell Spyder User's Guide 202 pages, Released Jul. 2007.

Siemens, BACnet for DESIGO 27 Pages, prior to Dec. 30, 2009.

Tridium, "Tridium & Niagara Framework Overview," 9 pages, prior to Oct. 28, 2008.

Tridium, "NiagaraAX Product Model Overview," 7 pages, 2005.

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 623 pages, 2002.

* cited by examiner

Figure 6

APPROACHES FOR SHIFTING A SCHEDULE

The present application is related to U.S. patent application Ser. No. 12/260,046, filed Oct. 28, 2008, entitled "A Building Management Configuration System". U.S. patent application Ser. No. 12/260,046, filed Oct. 28, 2008, is hereby incorporated by reference.

BACKGROUND

The invention pertains to schedules and particularly to making additional schedules relating to the aforementioned schedules. More particularly, the invention pertains to schedules for various components of a building.

SUMMARY

The invention is an approach for deriving additional schedules from a master schedule but with different scheduled-on time periods. The additional schedules may be shifted master or reference schedules. The scheduled-on and scheduled-off periods of the reference schedule may be shifted for the additional schedules. The reference schedule may have special events which may have their own scheduled-on and scheduled-off periods which may override the scheduled-on and scheduled-off periods of the day to which the special event is assigned. The scheduled-on and scheduled-off periods of the special events may be shifted for the shifted schedules.

BRIEF DESCRIPTION OF THE DRAWING

FIG. 6 is a diagram showing a schedule with a special event's scheduled-on period highlighted by an oval in the screen;

DESCRIPTION

Figure 1:
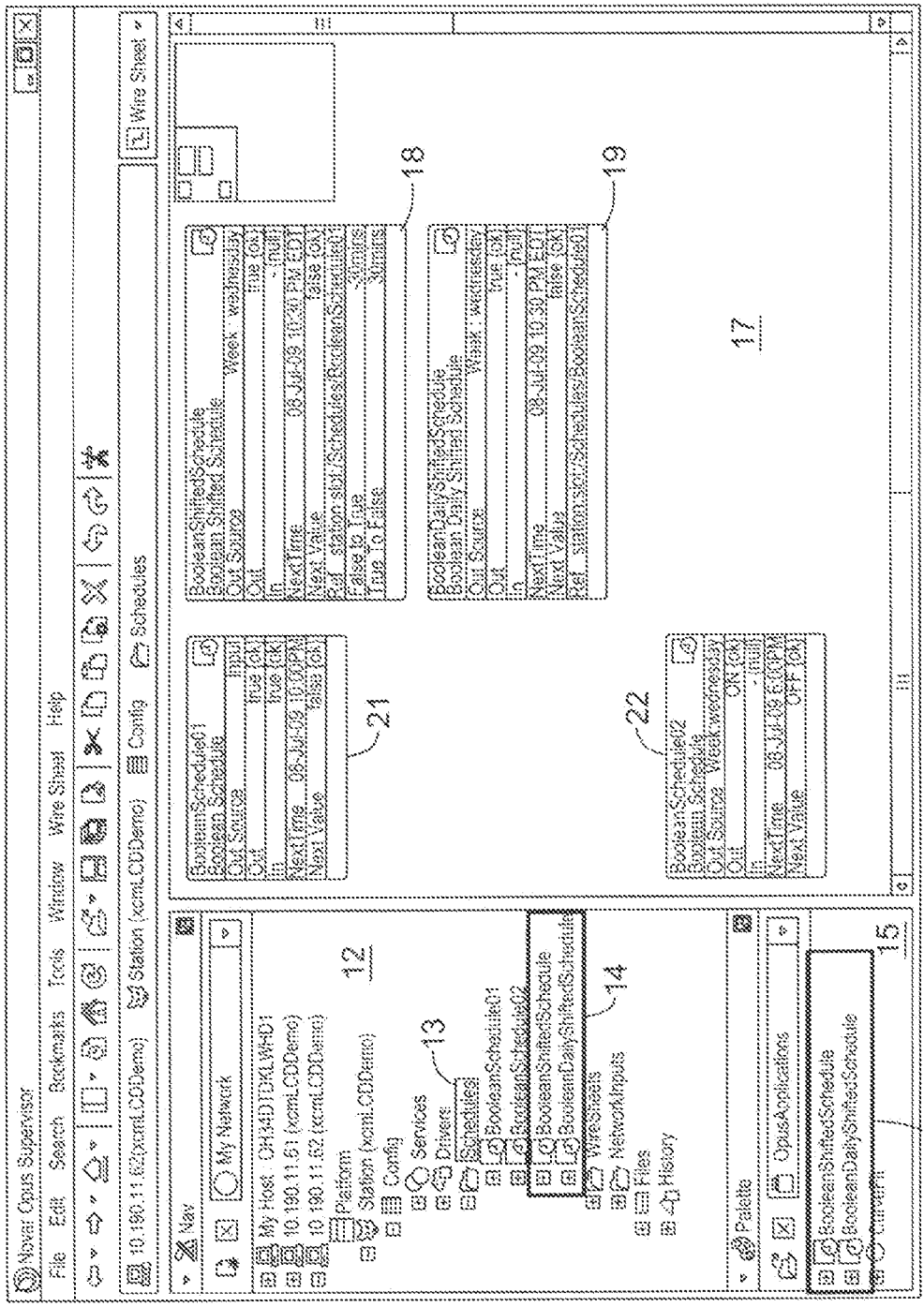
FIG. 1 is a diagram of a screen showing shifted schedule components.

In building automation systems, there is a desire to manage system control activities with a single master weekly schedule. Zones or equipment could then be controlled by creating shifted schedules which shift the time-of-day events of the master schedule. The overhead and complexity of system management and maintenance can be greatly reduced. Changes in occupancy or hours of operation may be implemented by adjusting just the master schedule.

The present approach relates to a building control system ("BCS") built upon a NiagaraAX™ (NiagaraAX or Niagara) Framework™ (framework) by Tridium, Inc. The NiagaraAX framework may provide a set of weekly schedule components. A weekly schedule may define a sequence of repeating time-of-day events for each day of the week as well as exceptions to the normal weekly schedule (called "special events").

System control activities (i.e., lights on/off, air conditioning on/off) may then be managed by creating schedules which shift the time of day events of the master schedule. System management may be much simpler when changes to the building's hours of operation are implemented by editing or shifting just the master schedule. The shifted schedules may simply apply their shifts to an updated master schedule.

The building control system may be configured with multiple zones. For example, a zone may be a department within a large retail store. Each zone may include heating, ventilation and air conditioning ("HVAC") equipment and lighting controls. To efficiently manage the building's energy usage, temperature setpoints and lights in each zone may be controlled separately. Additionally, the controls should be scheduled based on the building's operating mode. The store may be open for business from 8:00 AM until 8:00 PM; however, employee-specific zones may be in use before and after normal store hours.

In an existing building control system, a weekly schedule may be created for each zone. The schedule may be customized to the zone's usage. Areas open to the public may be scheduled-on or open during normal operating hours and scheduled-off or closed outside normal operating hours. Employee-specific areas may be scheduled-on earlier and later times than those of the public areas. For safety reasons, parking lot lights should be scheduled to be on prior to the store opening and stay on for a period after the store closes. Therefore, parking lot lights require a weekly schedule that needs to be managed. Any time that there is a change in occupancy or hours of operation, multiple weekly schedules need to be manipulated. As a building size grows and the mixed usage of building space increases, the complexity and overhead of managing and controlling schedules may increase.

With the present approach, a single master weekly schedule may be defined for the building. To control each zone, separate shifted schedules may be established. These separate schedules may control setpoints and lighting by shifting the on-to-off and off-to-on transitions of the master schedule. For instance, the normal weekly schedule for Monday may transition from off-to-on at 8:00 AM and transition from on-to-off at 8:00 PM. A shifted schedule for an employee mode may need to, for example, transition from scheduled-off to scheduled-on one hour earlier and transition from scheduled-on to scheduled-off one hour later. The employee mode schedule may be assigned to employee specific zones within the building such as the warehouse and break room. The complexity and overhead of schedule management and control may be greatly reduced. Again, a change in occupancy or hours of operation may be implemented by adjusting just the master schedule.

The present approach has two kinds of shifted schedules. A first kind is a ShiftedSchedule (shifted schedule) which provides a single set of off-to-on and on-to-off shifts. These shifts may be applied to every day of the week and special events. The second kind is a DailyShiftedSchedule (daily shifted schedule) which provides a set of separate off-to-on and on-to-off shifts for each day of the week and for special events. That is, there may be more than one set of shifts for the week with the second kind of shifted schedule and one set of shifts with the first kind of shifted schedule.

The NiagaraAX framework may provide four types of weekly schedule components. These types of components may vary by data value. The data values for these types may include Boolean, numeric, enumeration and string. Shifted schedule and daily shifted schedule types may be implemented for each of the weekly schedule types. The examples described herein are of the Boolean type for illustrative purposes; however, these examples may be described in terms of a numeric, enumeration or string type of data values.

One approach may be illustrated with examples described herein which invoke components for the Boolean weekly schedule type. These components may be referred to as a BooleanShiftedSchedule (shifted schedule) and a BooleanDailyShiftedSchedule (daily shifted schedule).

FIG. 1 is a diagram of a screen 11 showing shifted schedule components. The navigation (Nav) portion 12 for the network shows a listing of schedules 13 with the Boolean shifted schedule and the Boolean daily shifted schedule as highlighted by rectangle 14. A palette portion 15 for Opus™ (Opus) applications lists the Boolean shifted schedule and Boolean daily shifted schedule as highlighted by rectangle 16.

Details of schedules 13 are shown in a portion 17 of screen 11. Information about the Boolean shifted schedule is shown in block 18, and information about Boolean daily shifted schedule is shown in block 19. Also, details of BooleanSchedule01 and BooleanSchedule02 (regular or master schedules) are shown in blocks 21 and 22, respectively.

Applying Boolean logic to scheduling, the schedule state may be said to be true during a "scheduled-on" period and false during a "scheduled-off" period. When transitioning from a scheduled-off period to a scheduled-on period, the transition is from false to true. Similarly, when transitioning from a scheduled-on period to a scheduled-off period, the transition is from true to false.

Figure 2:
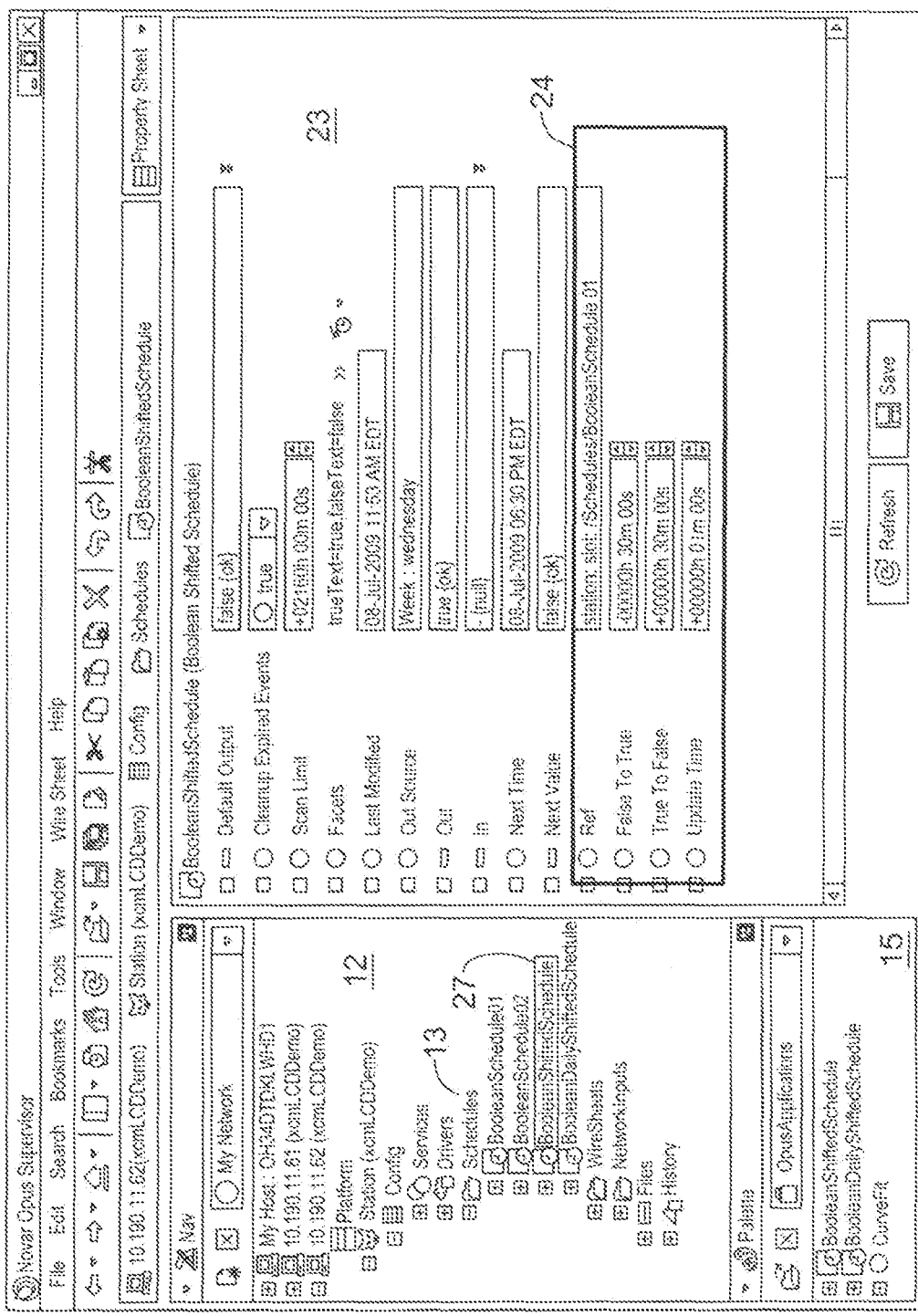
FIG. 2 is a diagram of a screen showing a selection of a shifted schedule showing key properties highlighted by a rectangle in the screen.

FIG. 2 is a diagram of screen 11 showing a selection of a shifted schedule showing key properties highlighted with a rectangle 24. The shifted schedule may have a regular NiagaraAX Boolean schedule with additional properties as highlighted by rectangle 24 in the shifted schedule presentation 23 selected by clicking on item 27 in Nav portion 12. "Ref" may identify the reference Boolean schedule to be shifted. "False to True" may define the amount of time by which the false-to-true transitions will be shifted. "True to False" may define the amount of time by which the true-to-false transitions will be shifted. "Update Time" may be the frequency with which the reference schedule should be checked for changes to time-of-day events or special events.

Figure 3:
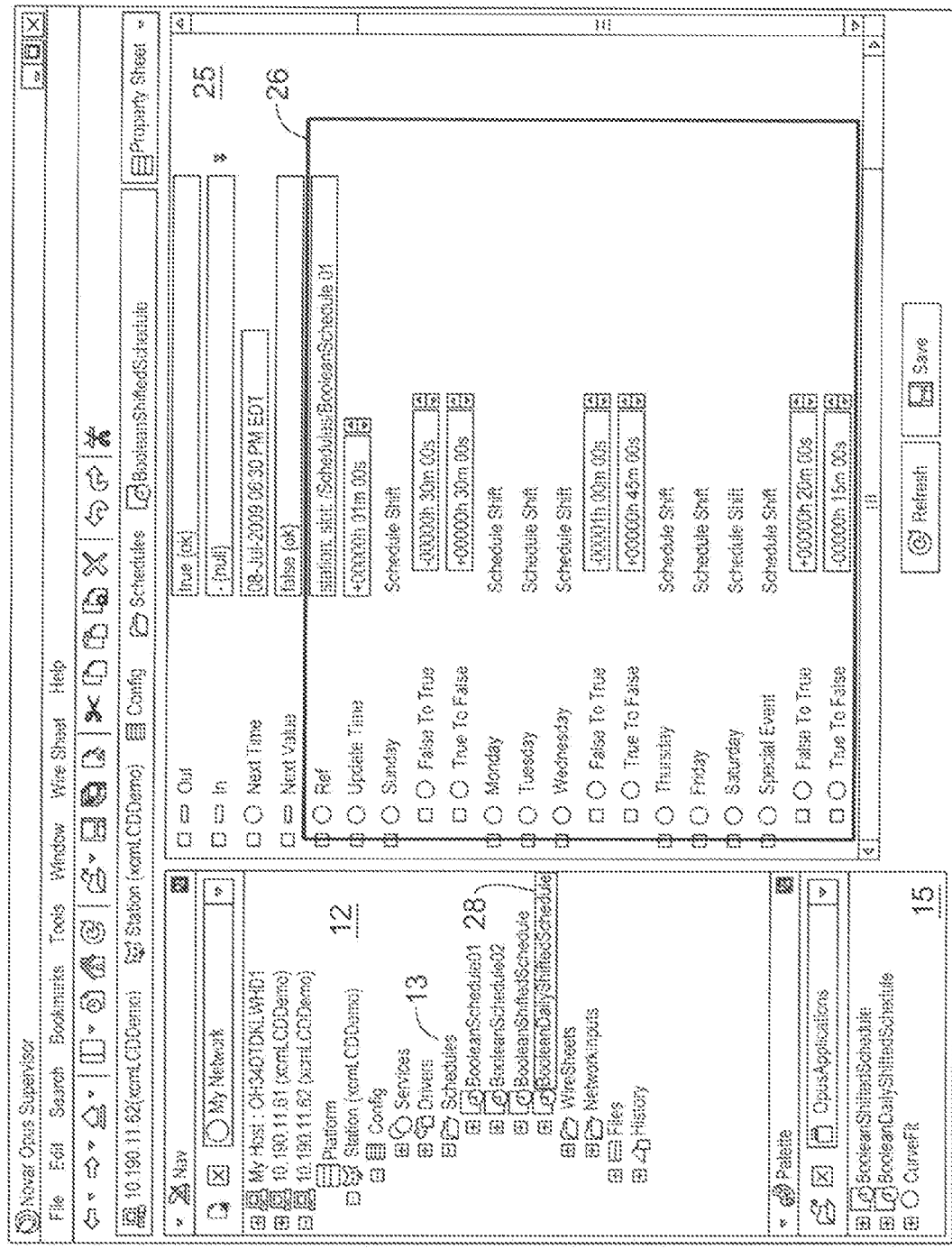
FIG. 3 is a diagram of a screen showing a selection of a daily shifted schedule showing key properties highlighted by a rectangle in the screen.

The Boolean daily shifted schedule may have a regular NiagaraAX Boolean schedule with the following additional properties as highlighted by rectangle 26 in presentation 25 of screen 11 shown in FIG. 3. The daily shifted schedule presentation 25 may be obtained by clicking on item 28 in Nav portion 12 of screen 11. "Ref" may identify the reference schedule to be shifted. "Update Time" may be the frequency with which the reference schedule should be checked for changes to time-of-day events or special events. "Schedule Shift" is an object type which defines a set of time shifts. An instance of this object type may exist for each day of the week and for the special events. It may have "False to True" which defines the amount of time by which the false-to-true transitions will be shifted, and "True to False" which defines the amount of time by which the true-to-false transitions will be shifted.

Figure 4:
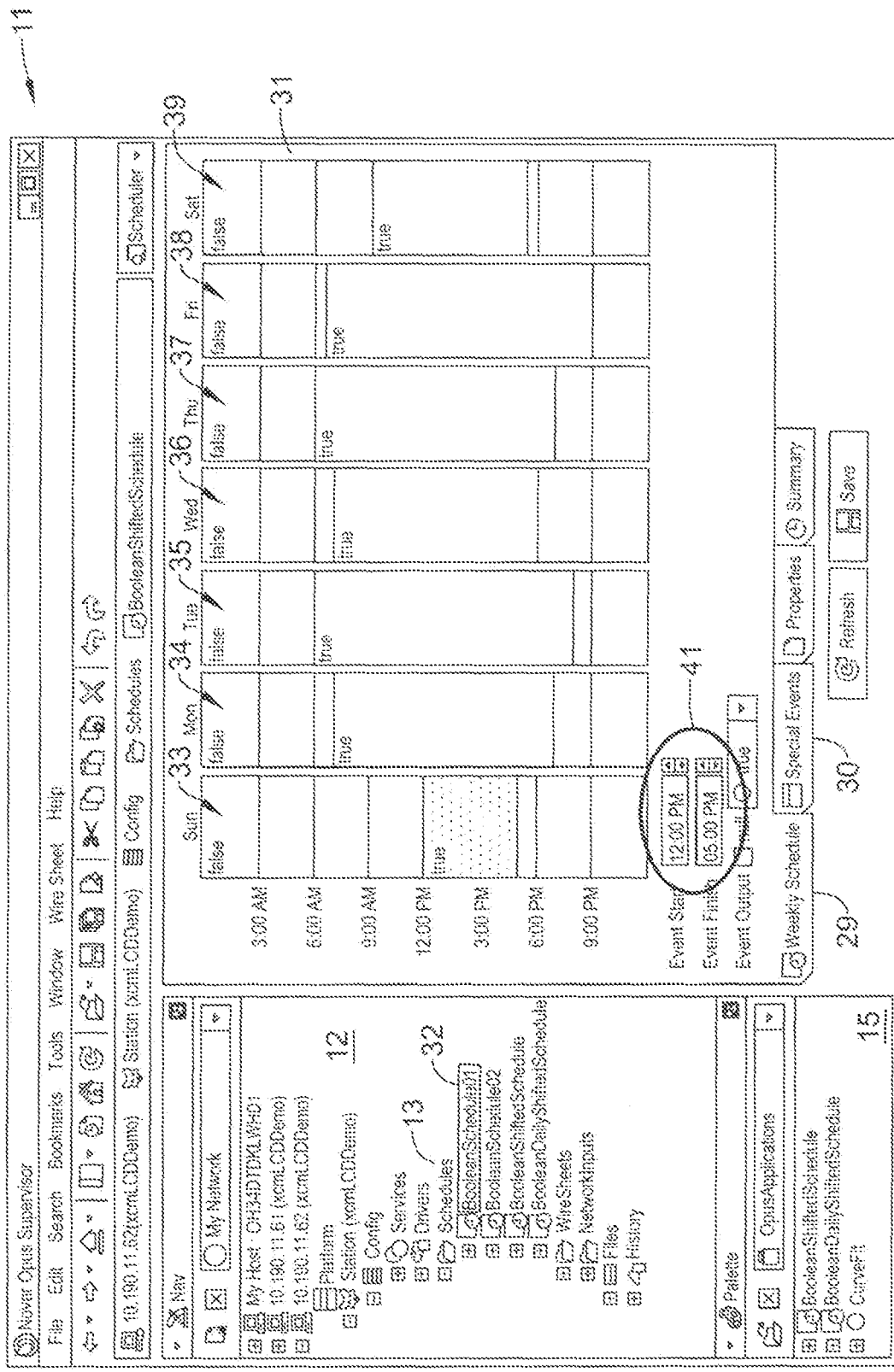
FIG. 4 is a diagram showing how a master weekly schedule may be created by clicking on an item of a navigation portion in the screen.
Figure 5:
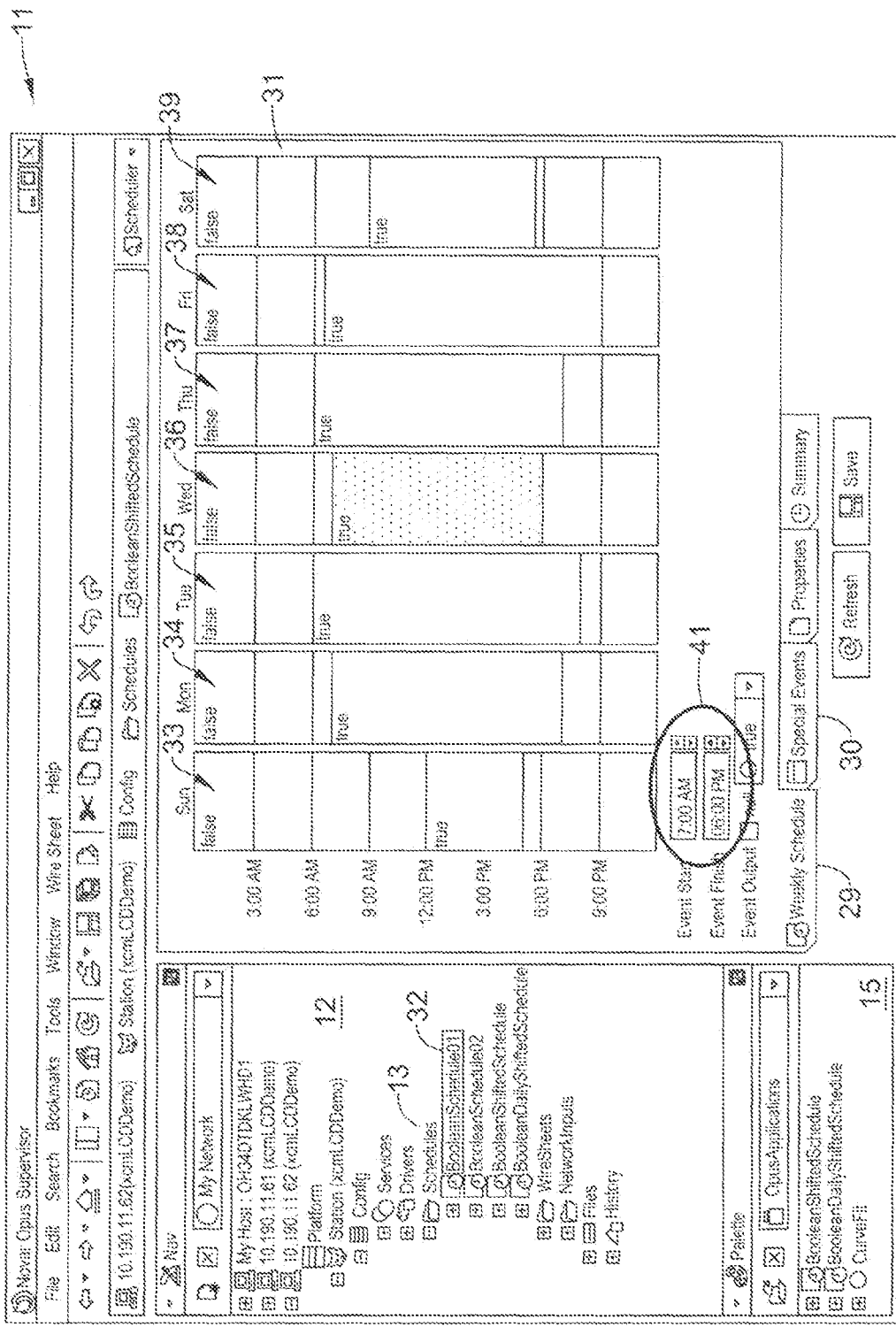
FIG. 5 is a diagram of an illustrative example of a scheduled-on period of a master weekly schedule, with the highlighted times in an oval for Wednesday's scheduled-on period in the screen.

One approach for schedule shifting may be made as in the following. A master or regular weekly schedule 31 may be created by clicking on item 32 of Nav portion 12 and on tab 29 at the bottom of schedule 31, as shown in screen 11 of FIG. 4. Appropriate scheduled-off and scheduled-on periods 33-39 may be viewed for each day of the week by clicking on the period and seeing the times at indicators shown in oval 41 in screen 11. For example, screen 11 shows a NiagaraAX Boolean schedule 31 with a Sunday's scheduled-on period 33 in terms of times highlighted by oval 41. FIG. 5 is a diagram of a screen 11 showing a NiagaraAX Boolean schedule with Wednesday's scheduled-on period 36, as another example, highlighted by oval 41. Additionally, special event times may be viewed by clicking on tab 30 at the bottom of schedule 31.

Figure 6:
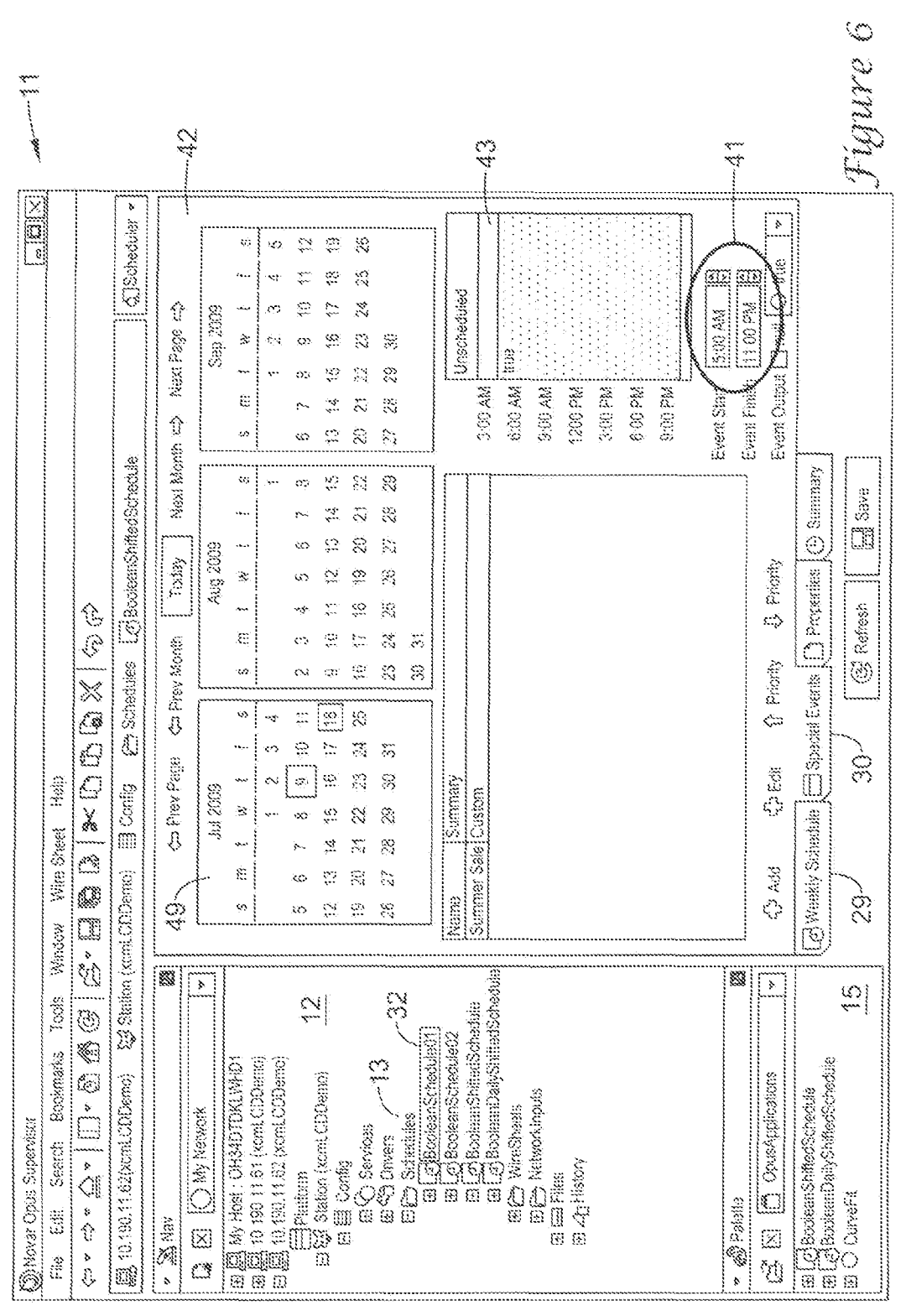

FIG. 6 is a diagram of screen 11 showing a NiagaraAX Boolean schedule in presentation 42 with a special event's scheduled-on period 43 with times highlighted by oval 41. The special event may be set to run from 5:00 AM to 11:00 PM on July 9 and 18 as indicated in period 43 and calendar 49 presentation 42, respectively.

Figure 7:
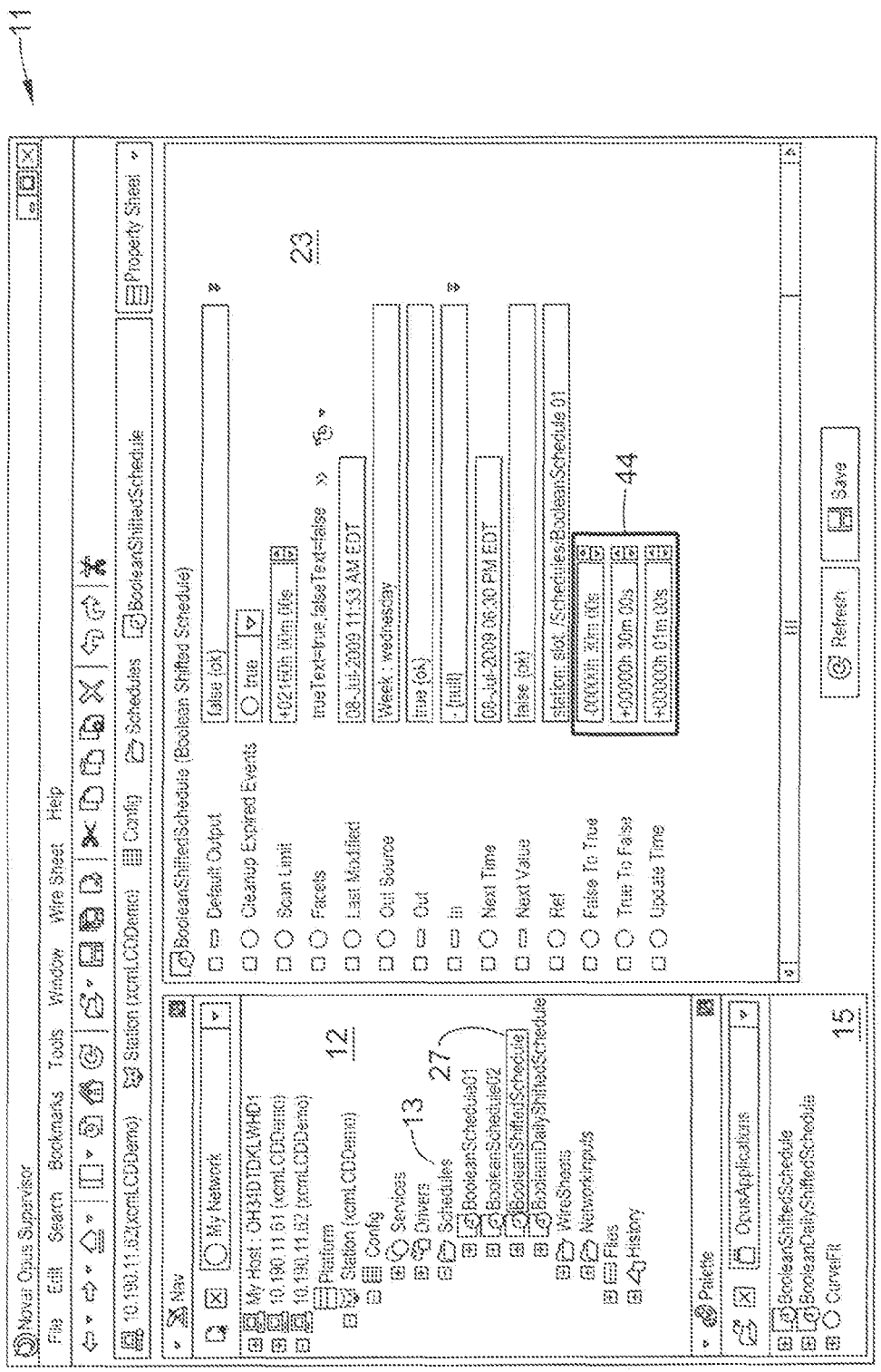
FIG. 7 is a diagram showing a shifted schedule with programmed settings highlighted by a rectangle in the screen.

A shifted schedule presentation 23 may then be added by clicking on item 27 in Nav portion 12 of screen 11 in FIG. 7. To configure the schedule, one may select a regular schedule as the reference or master schedule, define the false-to-true and true-to-false shift values, and set the update time within rectangle 44. Screen 11 shows shifted schedule items in presentation 23 which include programmed settings highlighted by rectangle 44. At a programmed update frequency or by a user triggered action, a shifted schedule may be obtained by applying the defined false-to-true and true-to-false shifts in presentation 23 to the reference schedule's time-of-day events and/or special events.

Figure 8:
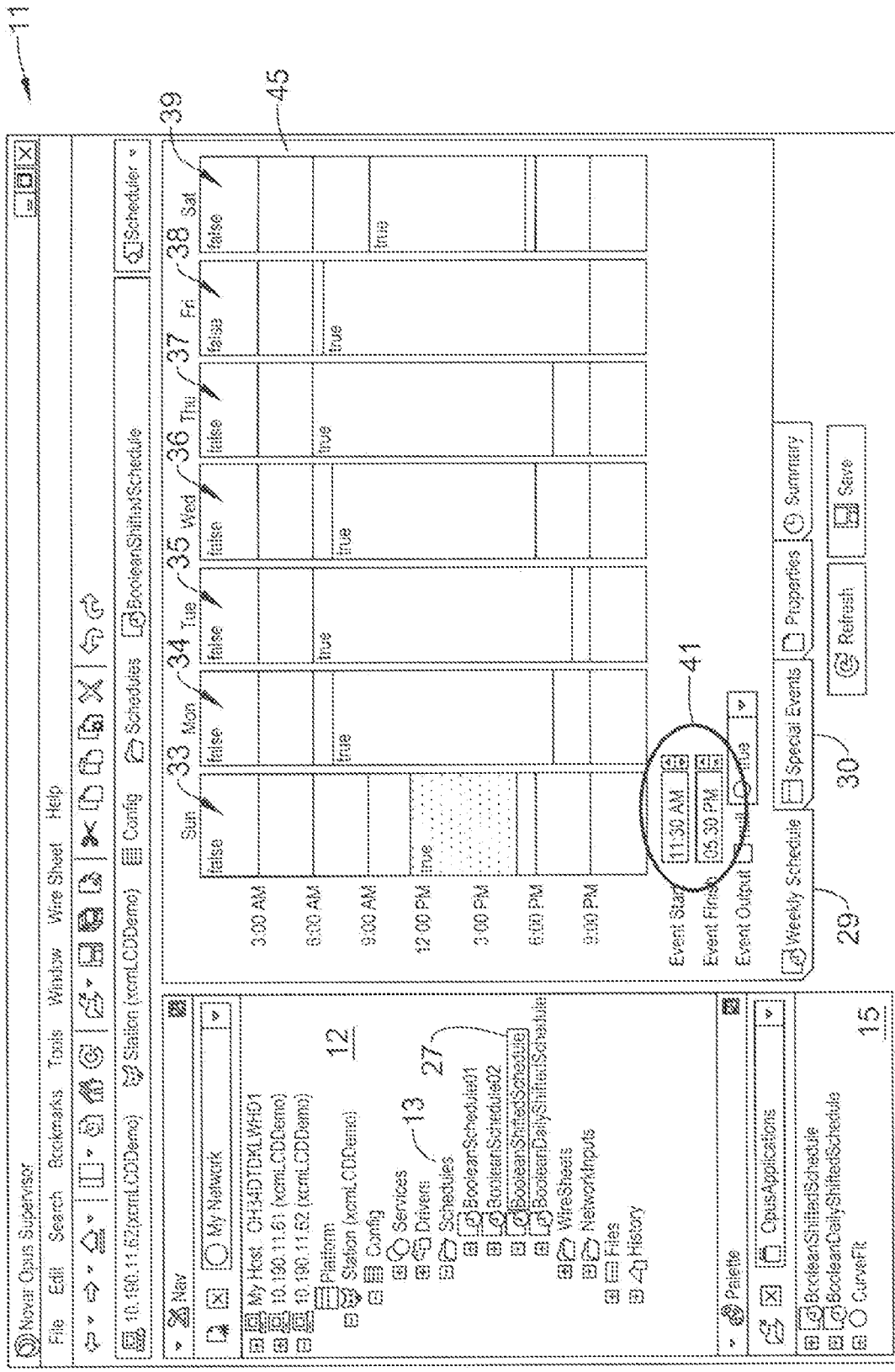
FIG. 8 is a diagram showing a shifted schedule with Sunday's shifted scheduled-on period highlighted by an oval in the screen.

FIG. 8 is a diagram of screen 11 showing shifted schedule presentation 45 with Sunday's shifted scheduled-on period 33 highlighted by oval 41. In presentation 31 of FIG. 4, highlighted times in oval 41 for Sunday's scheduled-on period 33 are shown to be from 12:00 PM to 5:00 PM. Programmed false-to-true and true-to-false shift settings indicate a minus 30 minutes and a positive 30 minutes, as highlighted by rectangle 44 in presentation 23 of screen 11 in FIG. 7. Application of the shifted schedule with the programmed shift settings of presentation 23 in screen 11 of FIG. 7, as applied to the Sunday's scheduled-on period 33 in FIG. 4, may result in a Sunday's "shifted" schedule on period 33 in FIG. 8 as highlighted by oval 41 in a shifted schedule presentation 45.

Figure 9:
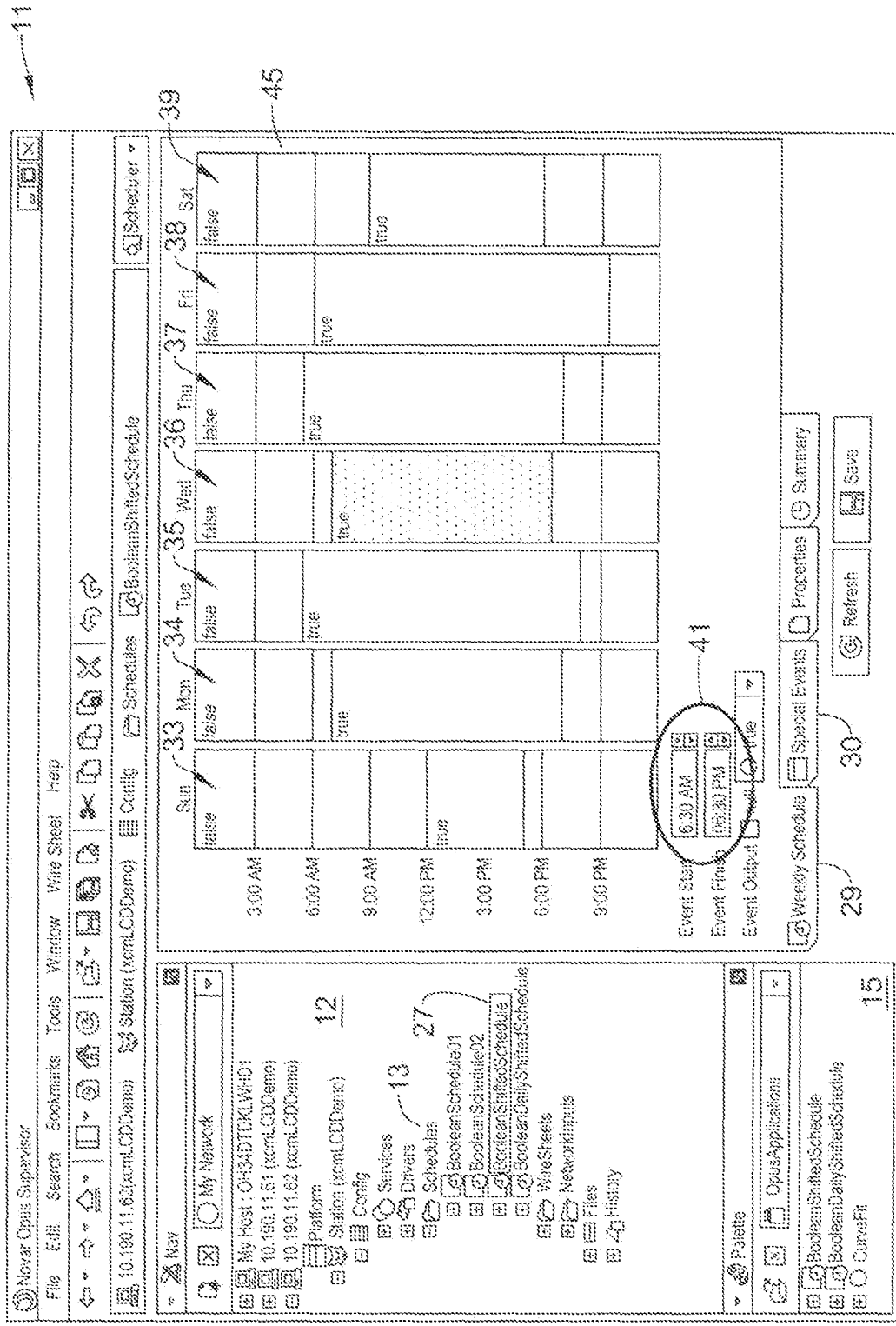
FIG. 9 is a diagram showing a shifted schedule with Wednesday's shifted scheduled-on period highlighted by an oval in the screen.

In presentation 31 of FIG. 5, for another illustrative example of a shifted scheduled-on period, the highlighted times in oval 41 for Wednesday's regular scheduled-on period 36, are shown to be from 7:00 AM to 6:00 PM. Programmed false-to-true and true-to-false shifts are settings that show a minus 30 minutes and a positive 30 minutes as highlighted with rectangle 44 in presentation 23 of screen in FIG. 7. Application of the shifted schedule with the programmed shift settings of presentation 23, as applied to the Wednesday's scheduled-on period 36 in FIG. 5, may result in a Wednesday's "shifted" scheduled-on period 36 in presentation 45 of screen 11 in FIG. 9, as highlighted by oval 41 in the shifted schedule presentation 45. It may be noted that the scheduled-on period 36 in FIG. 9 begins 30 minutes earlier and ends 30 minutes later than the regular scheduled-on period 36 in FIG. 5, in accordance with the shift entered in the false-to-true and true-to-false items, respectively, as highlighted by rectangle 44 in FIG. 7.

Figure 10:
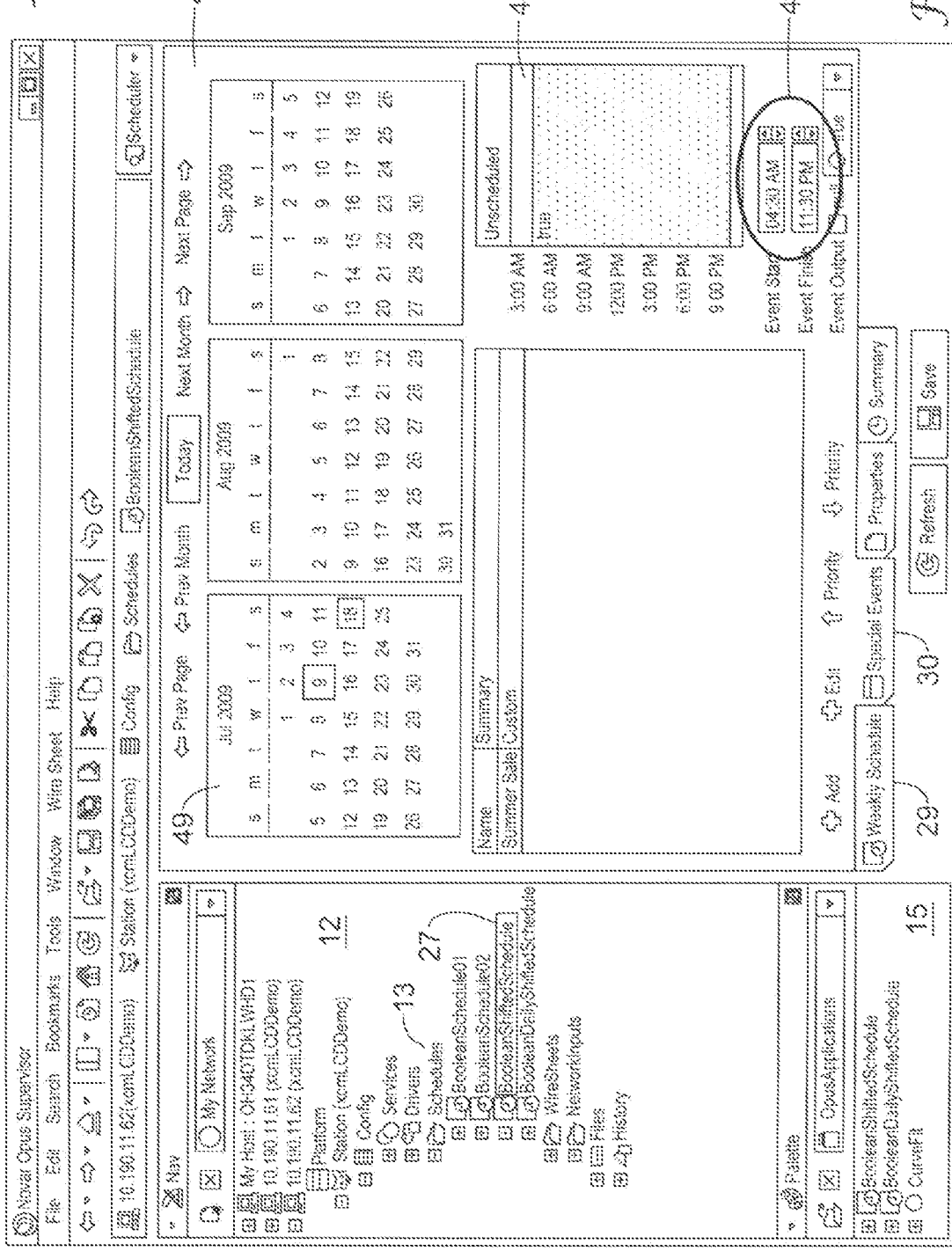
FIG. 10 is a diagram showing a shifted schedule with a special event's shifted scheduled-on period highlighted in the screen.

FIG. 10 is a diagram of screen 11 showing a shifted schedule with a special event's shifted scheduled-on period 43, as highlighted in oval 41 of presentation 46. Presentation 42 of FIG. 6 shows highlighted event start and finish times in oval 41 for a NiagaraAX Boolean regular schedule with a special event's scheduled-on period 43, which is revealed to be from 5:00 AM to 11:00 PM, respectively, for July 9 and 18 in calendar 49. As indicated herein, FIG. 7 shows a shifted schedule presentation 23 with programmed false-to-true and true-to-false shift settings having a minus 30 minutes and a positive 30 minutes, respectively, as highlighted with rectangle 44. Application of the shifted schedule with the programmed shift settings of presentation 23 in screen 11, as applied to the special event's scheduled-on period 43 in FIG. 6, may result in a special event's "shifted" scheduled-on period 43 in FIG. 10. It may be noted that the scheduled-on period 43 begins 30 minutes earlier and ends 30 minutes later than the special event regular scheduled-on period 43 in FIG. 6 in accordance with the shift entered in the false-to-true and the true-to-false items, respectively, as highlighted by rectangle 44 in FIG. 7.

A daily shifted schedule may be effected. To configure the component, one may select a regular schedule as the reference schedule, set the update time, and assign false-to-true and true-to-false shift values for each day of the week and for special events in a single presentation of screen 11.

Figure 11:
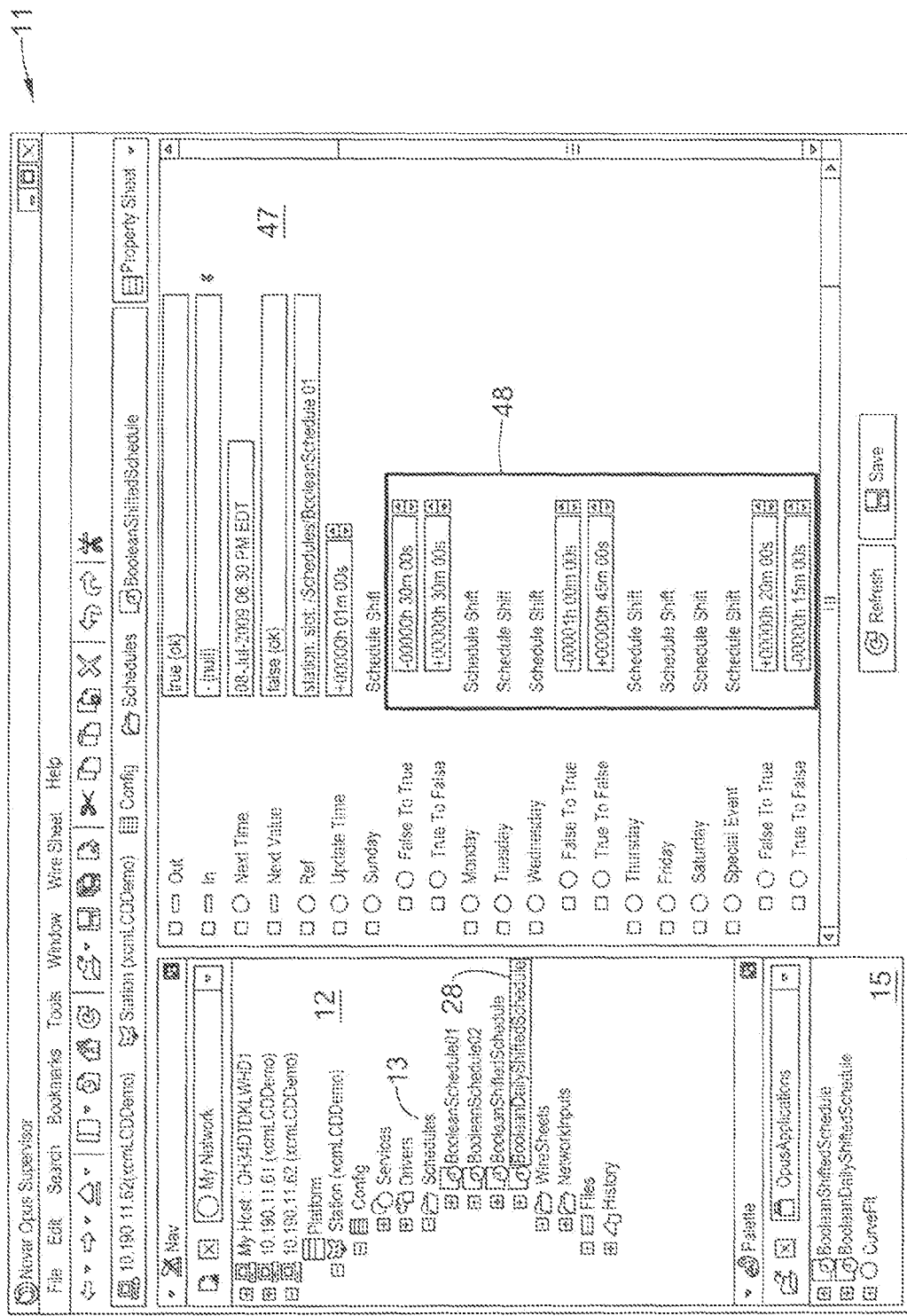
FIG. 11 is a diagram showing a daily shifted schedule with programmed settings highlighted by a rectangle in the screen.

A diagram of screen 11 in FIG. 11 shows a daily shifted schedule with key properties highlighted with a rectangle 48. To configure the schedule, a regular schedule may be selected as a reference schedule (i.e., master schedule) like the one in presentation 31 of FIG. 4. One may click on item 28 of Nav portion 12 to get presentation 47 where the reference Boolean schedule ("Ref") can be selected and the false-to-true and the true-to-false values can be assigned for each day of the week and for special events via programmed settings as highlighted by a rectangle 48. At a programmed update frequency or by a user triggered action, a daily shifted schedule may apply an appropriately defined set of false-to-true and true-to-false shifts to the time of day events for each day of the week and the special events of the reference schedule. The schedule shift may be set for each day of the week within one window or presentation 47 in screen 11 of FIG. 11, as highlighted by rectangle 48. Also, a schedule shift for special events may also be set along with the schedule shift for each day of the week.

In the illustrative example shown in FIG. 11, schedule shifts may be made for Sunday, Wednesday, and a special event in one presentation 47. However, additional settings may be made for each day of the week and the special events with the settings highlighted by rectangle 48.

In sum, the shifted schedule described herein shows a presentation with one set of settings which may be applied separately to each day of the week and each special event, whereas the daily shifted schedule may be applied simultaneously to all days of the week and special events which can have different shift settings for each day and special events.

At the programmed update frequency or by user triggered action, the daily shifted schedule may apply the appropriately defined set of false-to-true and true-to-false shifts to the time-of-day events for each day of the week and special events of the reference schedule. The results of the defined set in rectangle 48 of presentation 47 in FIG. 11 are illustrated in FIGS. 12-14.

Figure 12:
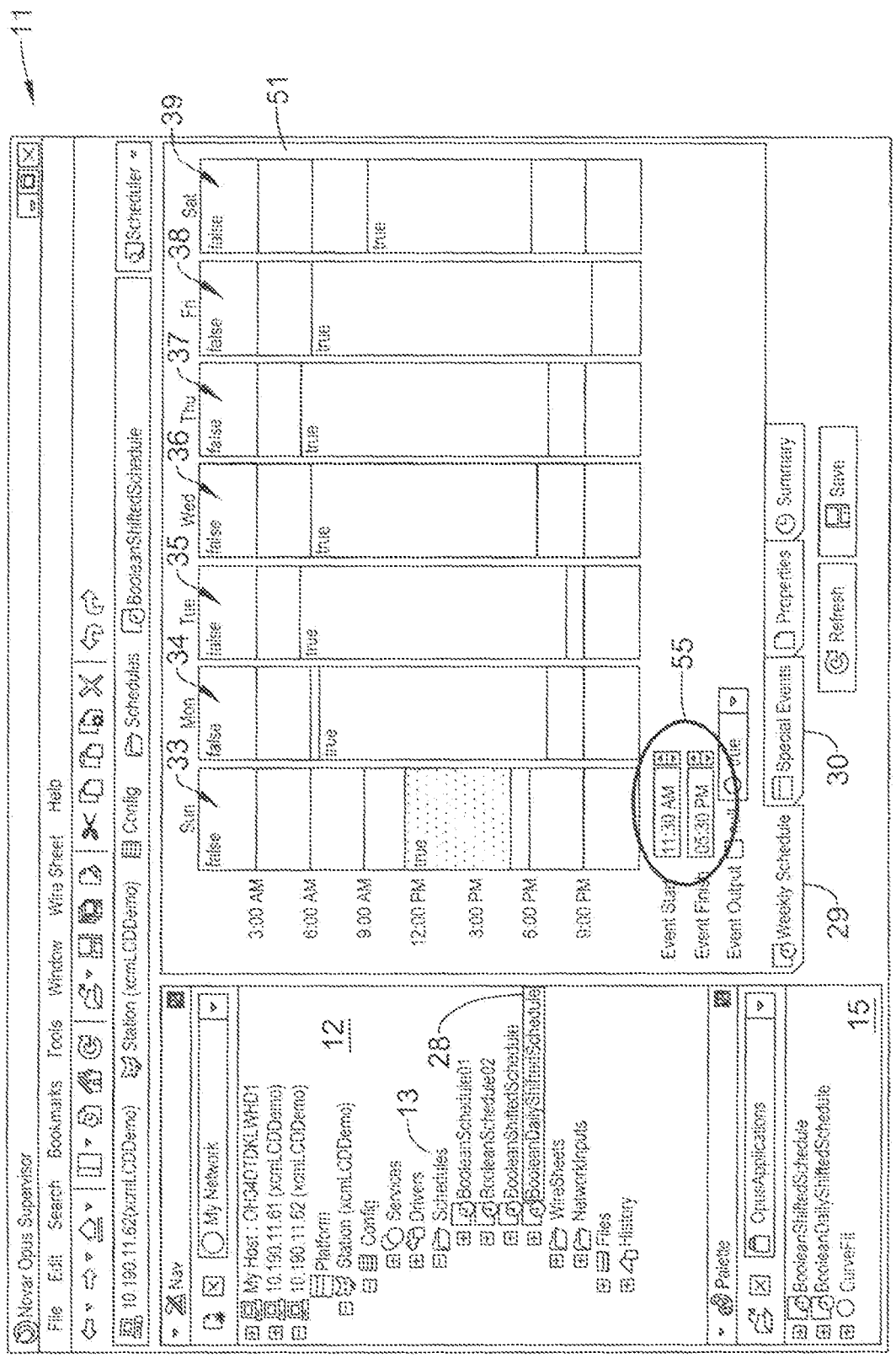
FIG. 12 is a diagram of a daily shifted schedule with Sunday's shifted scheduled-on period highlighted in the screen.

FIG. 12 is a diagram of screen 11 showing a daily shifted schedule presentation 51, with Sunday's shifted scheduled-on period 33 as highlighted within an oval 55 which shows a start at 11:30 AM and a finish at 5:30 PM which is 30 minutes earlier than the normal start time and 30 minutes later than the normal finish time, as indicated in the settings highlighted by rectangle 48 of presentation 47 in screen 11 of FIG. 11. These settings may be shown for Sunday by clicking on period 33.

Figure 13:
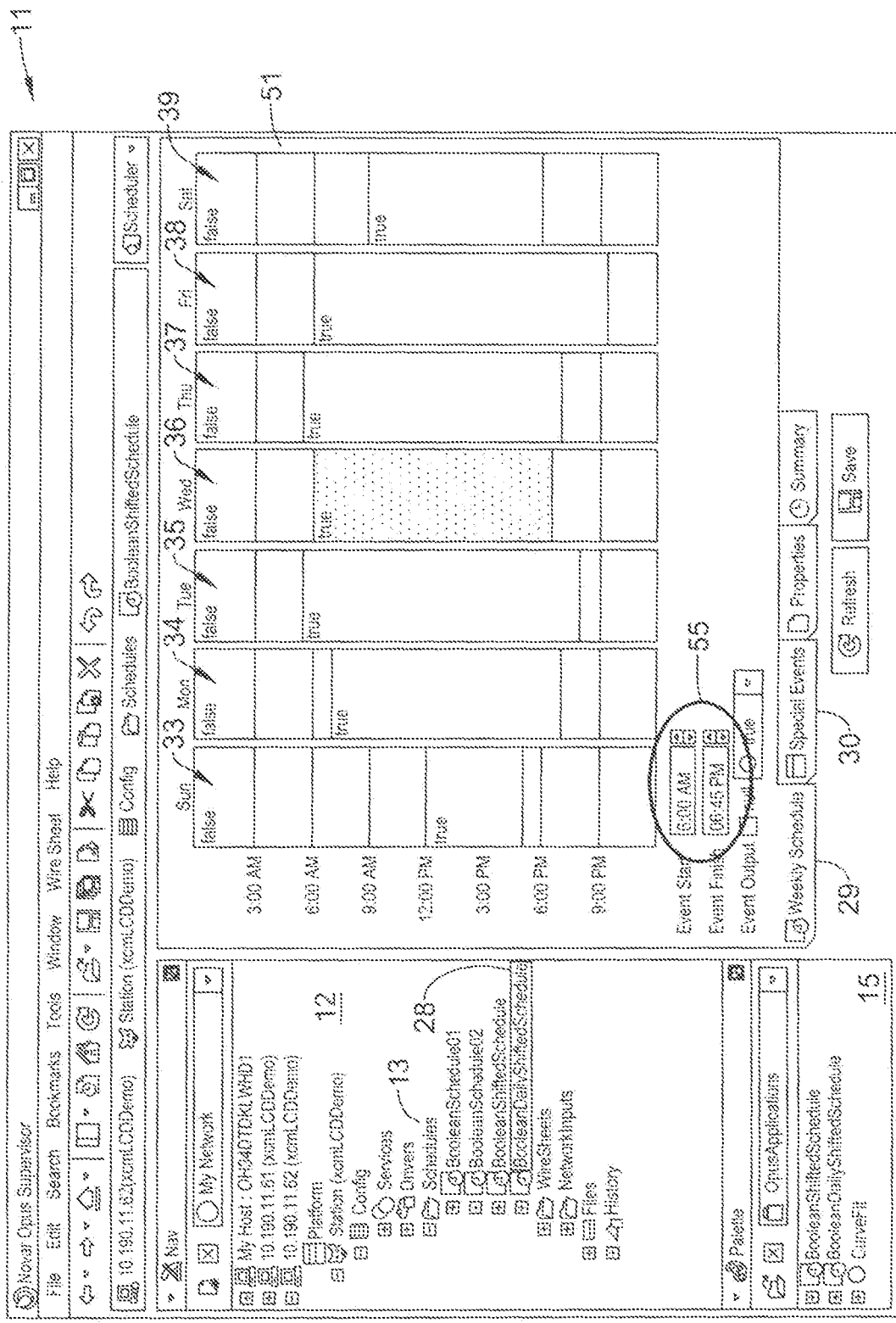
FIG. 13 is a diagram of a daily shifted schedule with Wednesday's shifted scheduled-on period highlighted in the screen.

FIG. 13 is a diagram of screen 11 showing a daily shifted schedule presentation 51 with Wednesday's shifted scheduled-on period 36 highlighted with an oval 55 which shows a start at 6:00 AM and a finish at 6:45 PM which is one hour earlier than the normal start time and 45 minutes later than the normal finish time, as indicated in the settings highlighted by rectangle 48 of presentation 47 in screen 11 of FIG. 11. These settings may be shown for Wednesday by clicking on period 36. Settings for another day of the week may be shown in oval 55 by clicking on the respective period.

Figure 14:
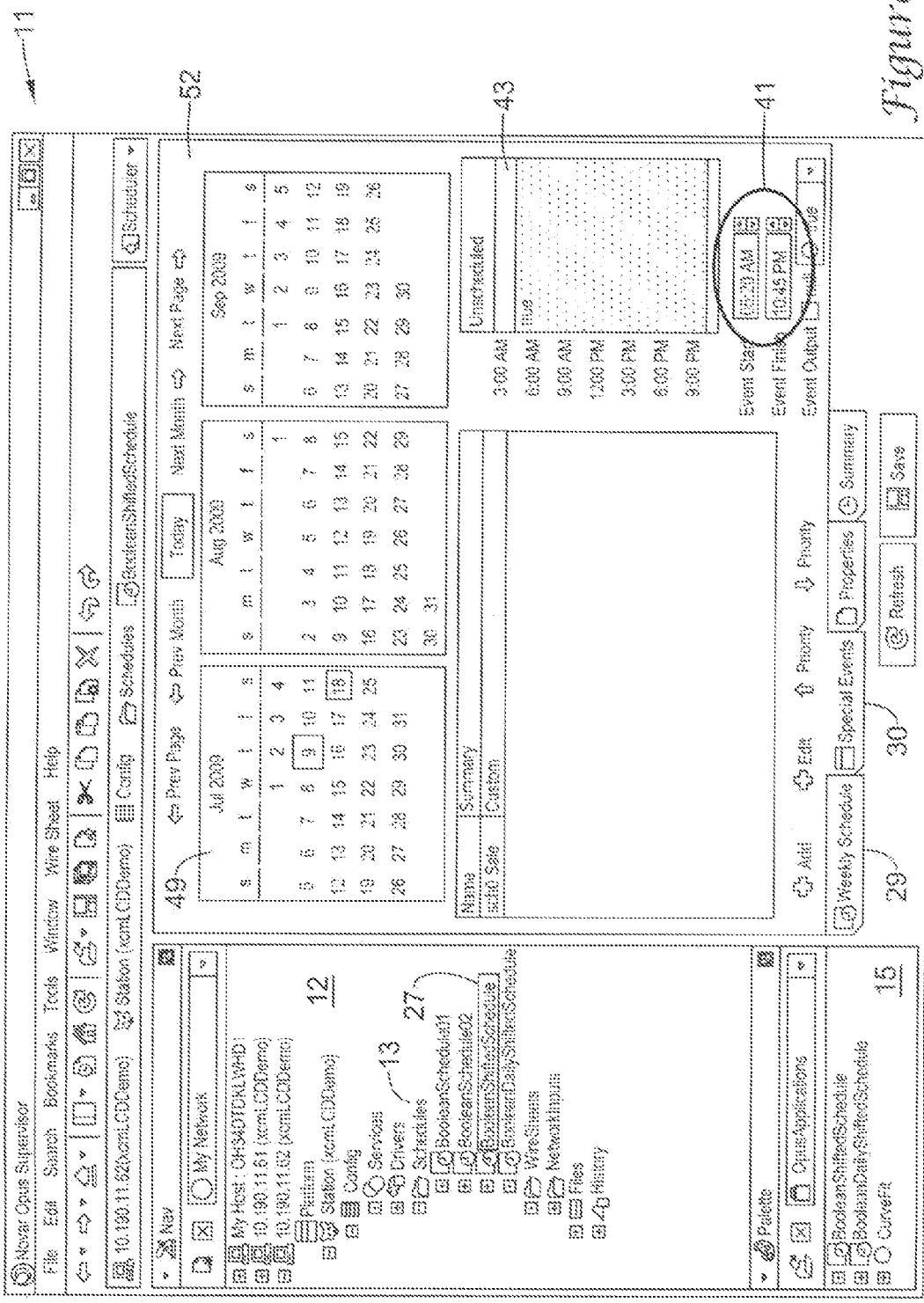
FIG. 14 is a diagram of a daily shifted schedule with a special event's shifted scheduled-on period highlighted in the screen.

FIG. 14 is a diagram of a screen 11 showing a daily shifted schedule presentation 52 with a special event's shifted schedule on period 43 with start and finish times as highlighted by oval 41. The start time is 5:20 AM and the finish time is 10:45 PM for the shifted scheduled-on period 43. It may be noted that period 43 begins 20 minutes later and ends 15 minutes earlier than normally scheduled according to the programmed settings as highlighted by rectangle 48 of the daily shifted schedule in presentation 47 of FIG. 11. A date or dates of a special event may be shown in calendar 49.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for shifting a schedule for a building automation system, comprising:
   providing a master schedule having a plurality of days, at least two of the plurality of days each having a scheduled-on period and a scheduled-off period; and
   applying shifts to at least some of the scheduled-on periods and scheduled-off periods of the plurality of days;
   wherein:
      shifts applied to the scheduled-on periods of two or more days of the master schedule can be of different amounts of time;
      shifts applied to the scheduled-off periods of two or more days of the master schedule can be of different amounts of time;
      the scheduled-on period has a state that is true;
      the scheduled-off period has a state that is false;
      the scheduled-on period begins with a false-to-true transition and ends with a true-to-false transition;

the scheduled-off period begins with a true-to-false transition and ends with a false-to-true transition;
a shift of a scheduled-on period is an amount of time that a false-to-true transition is shifted; and
a shift of a scheduled-off period is an amount of time that a true-to-false transition is shifted;
the method further comprising controlling operation of components of the building automation system by setting one or more weekly schedule components having instances of an object type that defines the amount of time the false-to-true transition is shifted and the amount of time the true-to-false transition is shifted.

2. The method of claim 1, wherein:
the master schedule can have one or more special events on one or more days;
the special events have scheduled-on and scheduled-off periods; and
the scheduled-on and scheduled-off periods of the special events replace the scheduled-on and scheduled-off periods of the one or more days on which the one or more special events are scheduled; and
wherein a shift can be applied to the scheduled-on period and/or the scheduled-off period of the one or more special events.

3. The method of claim 1, wherein:
shifts applied to the scheduled-on periods of two or more days of the master schedule are equal in amounts of time; and/or
shifts applied to the scheduled-off periods of two or more days of the master schedule are equal in amounts of time.

4. The method of claim 1, wherein:
shifts applied to the scheduled-on periods of two or more days of the master schedule are of different amounts of time; and/or
shifts applied to the scheduled-off periods of two or more days of the master schedule are of different amounts of time.

5. The method of claim 1, wherein:
one set of shifts applied to the scheduled-on and scheduled-off periods of the master schedule results in a shifted schedule; and
another set of shifts applied to the scheduled-on and scheduled-off periods of the master schedule results in another shifted schedule.

6. The method of claim 1, wherein:
the scheduled-on and scheduled-off periods of the master schedule are adjustable; and
an adjustment in scheduled-on and/or scheduled-off periods of the master schedule is provided as an update to corresponding shifted scheduled-on and/or scheduled-off periods of a shifted schedule.

7. The method of claim 1, wherein:
the master schedule is defined for normal operating hours at a building;
a first shifted schedule having at least one shift applied to the scheduled-on periods and/or scheduled-off periods of the master schedule is established for outside of the building; and
a second shifted schedule having at least one shift applied to the scheduled-on periods and/or scheduled-off periods of the master schedule is established for a certain zone inside of the building.

8. A schedule shifting system for a building automation system, comprising:
a regular schedule having scheduled-on and scheduled-off periods for each day in the regular schedule; and
one or more shifted schedules derived from the regular schedule, wherein the shifted schedules replicate the regular schedule but have shifts in at least some of the scheduled-on and scheduled-off periods of the regular schedule;
wherein:
shifts of a first shifted schedule of the shifted schedules applied to scheduled-on periods of different days of the regular schedule can be unequal amounts of time;
shifts of the first shifted schedule and/or another shifted schedule of the shifted schedules applied to scheduled-off periods of different days of the regular schedule can be unequal amounts of time;
scheduled-on periods have states that are true;
scheduled-off periods have states that are false;
scheduled-on periods begin with a false-to-true transition and end with a true-to-false transition;
scheduled-off periods begin with a true-to-false transition and end with a false-to-true transition;
a shift of a scheduled-on period is an amount of time that a false-to-true transition is shifted; and
a shift of a scheduled-off period is an amount of time that a true-to-false transition is shifted;
further wherein the schedule shifting system comprises a processor configured to control operation of components of the building automation system by setting one or more weekly schedule components having instances of an object type that defines the amount of time the false-to-true transition is shifted and the amount of time the true-to-false transition is shifted.

9. The system of claim 8, wherein:
the regular schedule can comprise one or more special events on one or more days having scheduled-on and scheduled-off periods which override scheduled-on and/or scheduled-off periods of the one or more days to which the special events are assigned; and
a shifted schedule can comprise the one or more special events with shifted scheduled-on and scheduled-off periods.

10. The system of claim 8, wherein:
shifts of a shifted schedule applied to scheduled-on periods of at least two of the days of the regular schedule are equal amounts of time; and/or
shifts of a shifted schedule applied to scheduled-off periods of at least two of the days of the regular schedule are equal amounts of time.

11. The system of claim 8, wherein:
shifts of a shifted schedule applied to scheduled-on periods of at least two of the days of the regular schedule are unequal amounts of time; and/or
shifts of a shifted schedule applied to scheduled-off periods of at least two of the days of the regular schedule are unequal amounts of time.

12. The system of claim 8, wherein:
the scheduled-on and scheduled-off periods of the regular schedule are adjustable; and
a change in the scheduled-on and scheduled-off periods for any day of the regular schedule is provided as an update of at least one of the one or more shifted schedules.

13. The system of claim 8, wherein the shifted schedules are built on a framework system.

14. A method for shifting a master schedule for a building automation system, comprising:
providing a master schedule in a framework system, the master schedule having a plurality of days, at least two of the plurality of days having scheduled off-to-on and scheduled on-to-off transitions, the framework system having one or more types of weekly schedule components having data values; and applying shifts to at least some of the scheduled off-to-on and scheduled on-to-off transitions of the master schedule; and wherein:
- a shift is an amount of time that a scheduled off-to-on or on-to-off transition is shifted;
- shifts applied to scheduled off-to-on transitions on different days of the master schedule can be unequal; and
- shifts applied to scheduled on-to-off transitions on different days of the master schedule can be unequal;

the method further comprising controlling operation of components of the building automation system by setting one or more weekly schedule components having instances of an object type that defines the amount of time the off-to-on transition is shifted and the amount of time the on-to-off transition is shifted.

15. The method of claim 14, wherein:

two or more shifts applied to scheduled off-to-on transitions of two or more days, respectively, of the master schedule are unequal; and/or two or more shifts applied to scheduled on-to-off transitions of two or more days, respectively, of the master schedule are unequal.

16. The method of claim 15, wherein:

the master schedule can have one or more special events;

a special event has scheduled off-to-on and scheduled on-to-off transitions;

the scheduled off-to-on and scheduled on-to-off transitions of a special event replace the scheduled off-to-on and scheduled on-to-off transitions of one or more days having special event(s); and the scheduled off-to-on and scheduled on-to-off transitions of the special event can be shifted.

17. The method of claim 14, wherein:

applying one or more shifts to scheduled off-to-on and/or scheduled on-to-off transitions of one or more days of the master schedule results in a shifted schedule;

the scheduled off-to-on and scheduled on-to-off transitions of the master schedule are adjustable; and a change in the scheduled off-to-on and scheduled on-to-off transitions for any day of the master schedule can be an update to the shifted schedule.

18. The method of claim 14, wherein the data values of schedule components are of a type selected from a group consisting of Boolean, numeric, enumeration and string types.

19. The method of claim 18, wherein the data values include data values of a Boolean type.

\* \* \* \* \*